United States Patent [19]
Keese

[11] 3,792,706
[45] Feb. 19, 1974

[54] DENTAL FLOSS HOLDER

[76] Inventor: Alfred E. Keese, 232 S. Story St., Boone, Iowa 50036

[22] Filed: July 31, 1972

[21] Appl. No.: 276,663

[52] U.S. Cl. .................................................. 132/91
[51] Int. Cl. ............................................. A61c 15/00
[58] Field of Search... 132/93, 89, 90, 91, 92; 32/40

[56] References Cited
UNITED STATES PATENTS

| 1,445,009 | 2/1923 | Eby | 132/92 A |
|---|---|---|---|
| 1,518,021 | 12/1924 | Truxillo | 32/40 |
| 1,217,779 | 2/1917 | Kleckner | 132/92 A |

*Primary Examiner*—Louis G. Mancene
*Assistant Examiner*—Gregory E. McNeill
*Attorney, Agent, or Firm*—Zarley, McKee & Thomte

[57] ABSTRACT

A pair of elongated members are pivotally and slidably interconnected and each includes at one end perpendicular finger portions to which a length of dental floss is connected. Shoulders are provided intermediate the ends of the elongated members for pivoting and sliding the members relative to each other. A housing having a chamber is provided on the end of one of the members and functions as a handle and a storage receptacle for a roll of dental floss which extends therefrom through an elongate passageway in one of the members to a gripping station on the end of the associated finger portion. An alternate structure includes an elongated flexible member adapted to be snapped between opposing positions and has spaced apart fingers including a length of dental floss extending therebetween. An elongated actuating member is connected to the outer end of the elongated flexible member for moving the flexible member between its two positions. A supply of dental floss is provided in a housing at the opposite end of the flexible member. The finger portions are resilient and will deform to a position parallel to each other and perpendicular to the flexible member upon sufficient forces being applied thereto by the dental floss.

6 Claims, 8 Drawing Figures

PATENTED FEB 19 1974 3,792,706
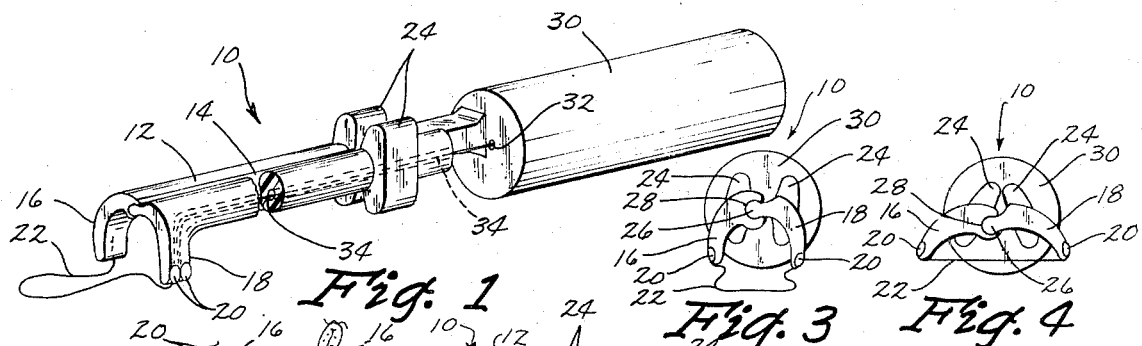
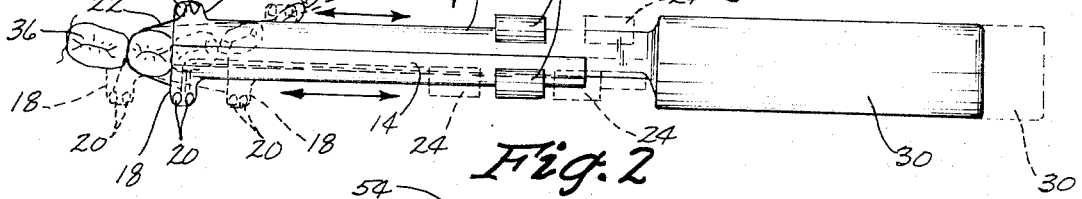
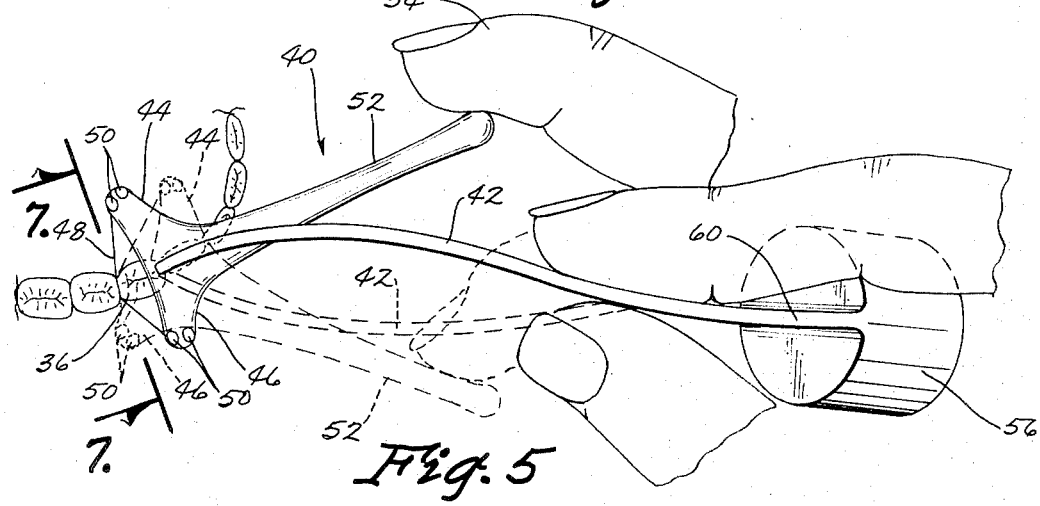
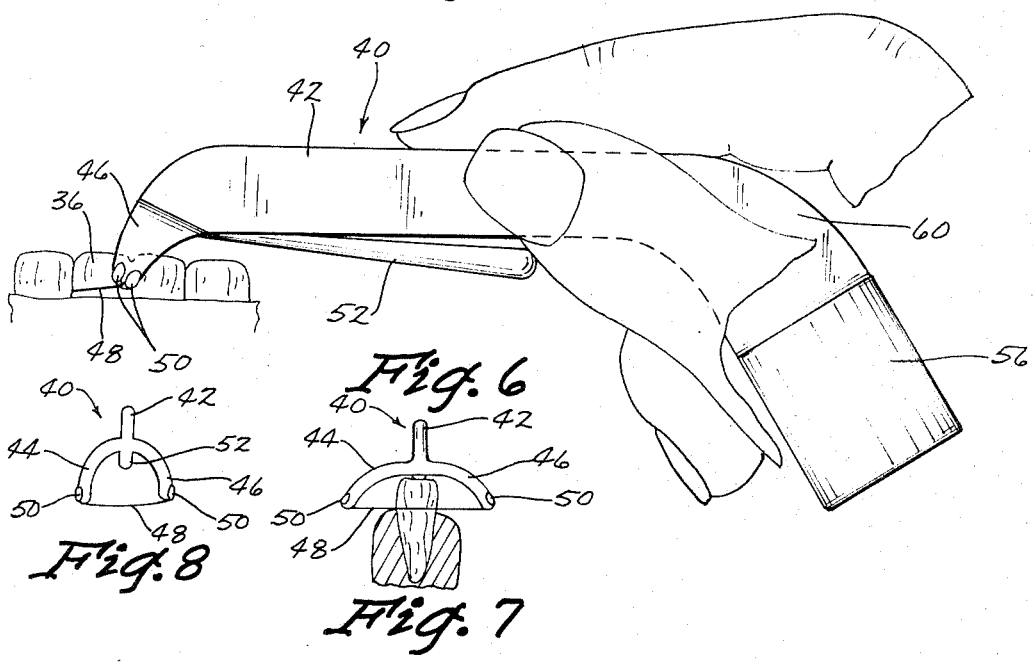

DENTAL FLOSS HOLDER

The use of dental floss, recognized as necessary as a supplement to brushing for proper dental care, is a difficult task at best. It is very awkward and cumbersome to hold a length of dental floss on the ends of fingers in one's own mouth. The space limitations are such that reciprocal movement with the fingers is nearly impossible. It is also very difficult to move the dental floss up and down to scrape the sides of the teeth.

The dental floss holder of this invention makes it convenient to position the dental floss in the mouth and then reciprocate the dental floss against three sides of each of the teeth as well as move it up and down. In one embodiment this action is made possible by the elongated members holding the length of dental floss being slidable relative to each other as well as pivotal while in a second embodiment the elongated member holding the length of dental floss at its end is made from a material which will snap between oppositely extending positions thereby causing the dental floss to reciprocate back and forth against the teeth. An actuating member extends partially along the flexible member and may be flipped from one side to the other for moving the flexible member between the two positions. The dental floss on a roll is stored at the inner end of the holder and is fed along the length of the holder to the gripping stations. The dental floss storage enclosure functions also as a handle.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a perspective view of the dental floss holder of this invention.

FIG. 2 is a top plan view thereof.

FIG. 3 is an end view thereof showing the finger portions holding the length of dental floss.

FIG. 4 is a view similar to FIG. 3 but showing the finger portions pivoted to an outwardly extending position.

FIG. 5 is a top plan view of an alternate embodiment and showing the holder in two different positions as indicated by the dash lines.

FIG. 6 is a side elevation view thereof.

FIG. 7 is a view taken along line 7 — 7 in FIG. 5; and

FIG. 8 is a view similar to FIG. 7 showing the resilient finger portions bent inwardly by the pull on the dental floss.

The dental floss holder of this invention is referred to generally in FIG. 1 by the reference numeral 10 and includes a pair of elongated body members 12 and 14 having outer perpendicular finger portions 16 and 18 extending perpendicularly thereto. The finger portions are straight at their outer ends and rounded where they connect onto the elongated body portions 12 and 14, as seen in FIG. 1. A pair of upstanding nodules 20 are provided on the ends of each of the fingers and permit a length of dental floss 22 to be secured to the finger ends which function as gripping stations. Intermediate the ends of the elongated members 12 and 14 are transversely extending actuating shoulders 24 which allow the operator to slide the elongated members relative to each other and also pivot them. The sliding and pivotal action is made possible, as seen in FIGS. 3 and 4, by a rib 26 on the elongated member 14 being received in a groove 28 in the member 12.

The inner end of the elongated member 12 terminates in a cylindrical enclosure 30 for storing a roll of dental floss which is fed out through an opening 32 into a passageway 34 extending the length of the member 14. The passageway 34 is in communication with the gripping station on the end of the finger portion 18 between the nodules 20 such that dental floss is continuously available at the operating end of the holder.

It is seen in operation that a length of dental floss is pulled from the storage enclosure and initially threaded through the passageway 34 whereupon it is then stretched across between the fingers 16 and 18 and secured to the nodules on each of the fingers. The holder is then placed in the mouth with the floss 22 around the sides of a tooth whereupon the fingers are pivoted in or out as desired while the elongated members 12 and 14 are reciprocated longitudinally by fingers working the shoulders 24. Thus as seen in FIG. 2, the length of dental floss 22 moves along three sides of the teeth as the elongated members 12 and 14 move between their extreme positions as seen in FIG. 2. More tension and tightening of the length of dental floss 22 may be accomplished by pivoting the fingers 16 and 18 outwardly. It is also seen that if the dental floss is maintained tight between the ends of the fingers 16 and 18 then the cleaning action on the teeth 36 is only along substantially one side which at times is what is desired. Ordinarily, however, it is desired to clean along three sides if possible.

In FIGS. 5 — 8 an alternate embodiment is shown and is referred to by the reference numeral 40. The dental floss holder 40 includes an elongated handle 42 having spaced apart outwardly extending finger portions 44 and 46 between which a length of dental floss 48 is connected on nodules 50. An actuating handle member 52 is connected to the outer end of the elongated member 42. The elongated member 42 is made of metal or plastic which will snap from the solid to the dash-line positions in FIG. 5 and remain in these positions until snapped back. This changing of positions is accomplished by the finger 54 pressing on the actuating member 52 at its outer end thereby causing the actuating member and the elongated flexible member 42 to snap to the dash-line position, as seen in FIG. 5. This in turn causes the length of dental floss 48 to move along the sides of the teeth 36 and thereby clean plaque therefrom. An enclosure 56 is provided at the inner end of the elongated flexible member 42 and holds a roll of dental floss which may extend along the length of the member 42 to the gripping station on the end of the finger 46 where it is secured to the nodules 50 and then across to the other finger 46 for connection to the corresponding nodules at that gripping station. It is seen in FIG. 6 that the inner or rear end 60 of the elongated flexible member 52 is curved downwardly to conform to the operator's hand.

The fingers 44 and 46 are resilient and normally extend at an angle, as seen in FIG. 7, but upon forces being applied to the length of dental floss 48 will deflect inwardly to the position of FIG. 8 thereby allowing the dental floss 48 to work along the sides of the tooth 36, as seen in FIG. 6. The action during cleaning is much the same as that of the dental floss holder shown in FIGS. 1 – 4 when the fingers are spaced close together or far apart as far as cleaning along one side of the tooth as compared to three sides.

Thus it is seen that with the dental floss holder placed in the mouth and the length of dental floss 48 between a pair of teeth the cleaning action can be obtained by a flick of the actuating lever 52 back and forth, as seen in FIG. 5. As desired, the contact can be varied from one side to three sides by varying the tension in the length of dental floss 48 which in turn varies the spacing between the fingers 44 and 46, as seen in FIGS. 7 and 8. It is further understood that the elongated flexible member 42 may be made of a spring material that normally extends straight and then may be pushed against the inherent spring action to either of solid or dash-line positions of FIG. 5. The spring action of the member will return it to a straight position.

I claim:

1. A dental floss holder comprising, first and second elongated parallel members slidably and pivotally connected together such that said members are longitudinally slidable, said elongated members being transversely pivotal via connection means located medially on said longitudinally slidable members, and gripping means on the outer ends of said members for holding a length of dental floss.

2. The structure of claim 1 wherein said connection is further defined as being a rib and groove connection.

3. The structure of claim 1 wherein each of said members are further defined as including at their outer ends perpendicularly extending portions and said gripping means being on the outer ends of said portions.

4. The structure of claim 1 wherein a dental floss compartment is provided on the inner end of said members and a roll of dental floss is provided in said compartment and a length of dental floss extends from said compartment to said gripping means along said members.

5. The structure of claim 4 wherein one of said members includes a passageway extending its substantial length and said length of dental floss extends through said passageway.

6. The structure of claim 1 wherein each of said members includes a shoulder intermediate its ends for actuating said members slidably and pivotally.

* * * * *